United States Patent
Thomas

(10) Patent No.: US 10,754,475 B2
(45) Date of Patent: Aug. 25, 2020

(54) NEAR ULTRASOUND BASED PROXIMITY SENSING FOR MOBILE DEVICES

(71) Applicant: Intel Corporation, Santa Clara, CA (US)

(72) Inventor: Tigi Thomas, Bangalore (IN)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/230,908

(22) Filed: Dec. 21, 2018

(65) Prior Publication Data

US 2019/0302916 A1    Oct. 3, 2019

(51) Int. Cl.
*G06F 3/043*    (2006.01)
*G10K 15/08*    (2006.01)
*G10K 15/02*    (2006.01)

(52) U.S. Cl.
CPC ............ *G06F 3/043* (2013.01); *G10K 15/02* (2013.01); *G10K 15/08* (2013.01)

(58) Field of Classification Search
CPC ........ G06F 3/043; G10K 15/02; G10K 15/08; G01S 15/04; G01S 7/527; G01S 7/539
USPC ........................................................ 345/177
See application file for complete search history.

(56) References Cited

U.S. PATENT DOCUMENTS

| | | | |
|---|---|---|---|
| 5,436,580 A * | 7/1995 | Kellmann | G01R 29/02 327/24 |
| 6,542,436 B1 | 4/2003 | Myllyla | |
| 2015/0085620 A1* | 3/2015 | Macours | H03G 3/3005 367/199 |
| 2017/0329928 A1* | 11/2017 | Song | A61B 8/5207 |
| 2018/0160235 A1 | 6/2018 | Lesso et al. | |
| 2019/0187261 A1* | 6/2019 | Peso Parada | G01S 7/521 |
| 2019/0277966 A1* | 9/2019 | Schoessler | H04M 1/72569 |

OTHER PUBLICATIONS

Extended European Search Report dated Jun. 22, 2020 for European Patent Application No. 19210054.3, 10 pages.

* cited by examiner

*Primary Examiner* — Mark Edwards
(74) *Attorney, Agent, or Firm* — Schwabe, Williamson & Wyatt, P.C.

(57) ABSTRACT

Mobile device and method of operating such device with which a near ultrasonic acoustic signal may be produced for emission by an existing transducer, such as an ear piece, to cause a corresponding echo from a proximate object. The echo may be received by another existing transducer, such as a microphone, and processed to produce a corresponding status signal indicative of the proximity of such object.

19 Claims, 10 Drawing Sheets

NEAR ULTRASOUND BASED PROXIMITY SENSING FOR MOBILE DEVICES

BACKGROUND

The present disclosure relates to proximity sensing techniques for mobile devices to sense proximity of the touchscreen display of the device to the user, and in particular, to sensing techniques based on sound rather than light.

Proximity sensing is an important feature for touchscreen based mobile devices to detect the close presence of a part of the body of the user to, in the case of a user face, switch off the touchscreen display to prevent false touch events during voice calls, or, in the case of a user hand, to switch on the touchscreen display to enable touch events during device operation. Current mobile devices use infrared (IR) sensors to perform proximity sensing, which require area(s) adjacent the touchscreen on the front of the device. With devices trending toward significantly less frontal area available for a bezel, loss of space for IR sensors will require an alternative proximity sensing technique.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

As discussed in more detail below, proximity detection may be achieved using near-ultrasonic sound signals, which are inaudible in a frequency range from 17 KHz to 24 KHz. This technique avoids need for dedicated area(s) on the face of the host device for IR sensors since the built-in ear piece (EP) speaker may be used to emit the inaudible near-ultrasonic frequency sound waves along with normal speech and/or music.

Figure 1:
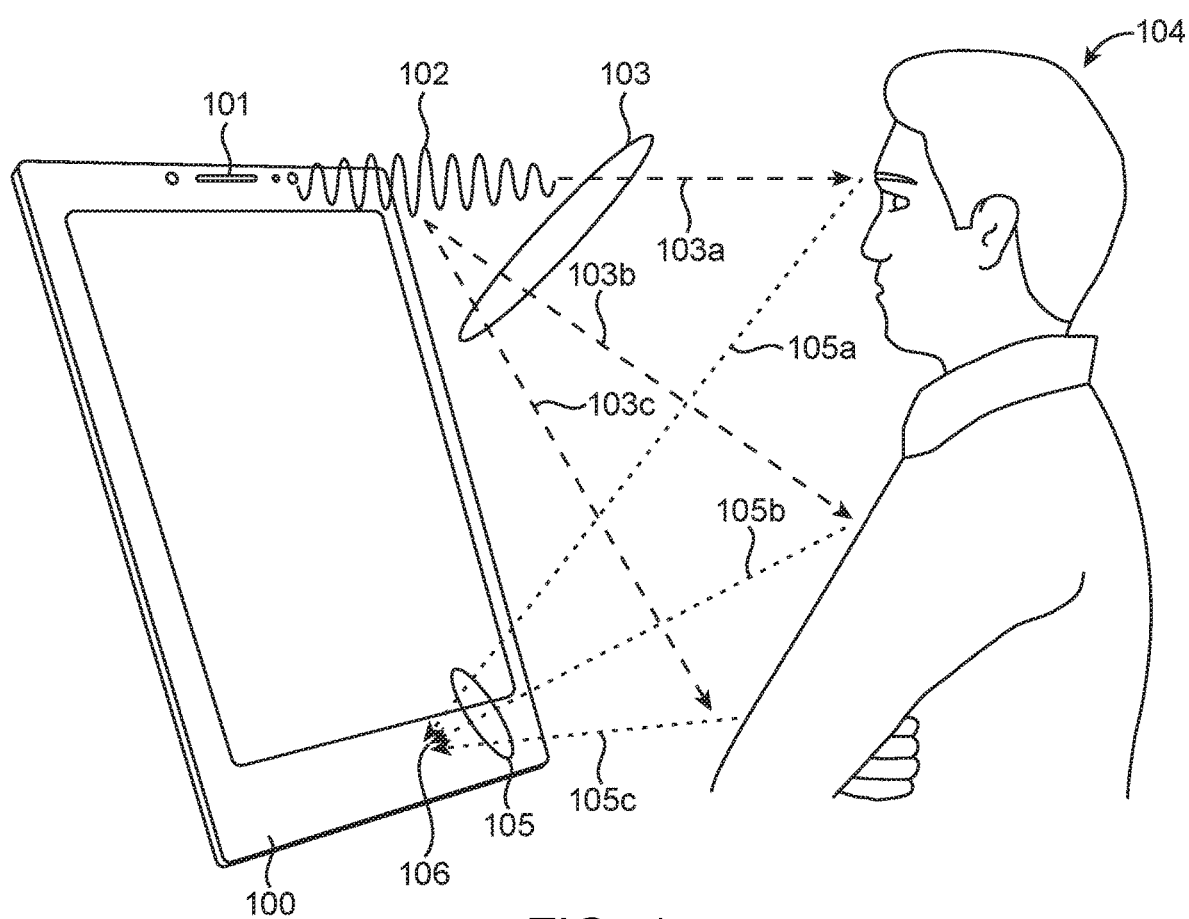
FIG. 1 illustrates signal paths for incident and reflected sound waves according to one embodiment.

FIG. 1 illustrates signal paths for incident 103 and reflected 105 sound waves according to one embodiment. The direction of the signal 102 emitted from the EP speaker 101 of the device 100 may be directed (e.g., beam formed) toward the head or ear of the user 104. The high frequency (HF) sound waves 103 reflect 105 from the user 104 and are captured by the built-in microphone 106. The cumulative strength of the reflected waves 105 is proportional to the proximity of the head of the user 104, and the energy of the reflected HF sound may be used is a cue for detecting that proximity.

As discussed in more detail below, proximity of a head/object may be detected using near ultrasonic sound waves along with an adaptive acoustic sensing algorithm that determines the echo reflection profile of the surroundings (e.g., changes based on sound-absorption characteristics of surrounding objects) and adapts the detection and its parameters (e.g., idle signal floor, sensitivity, etc.). This adaptive acoustic sensing also enables detection of high intensity environmental noise that can interfere with the near ultrasonic excitation signal (ES) and provide a corrective path to minimize false triggers.

Figure 2:
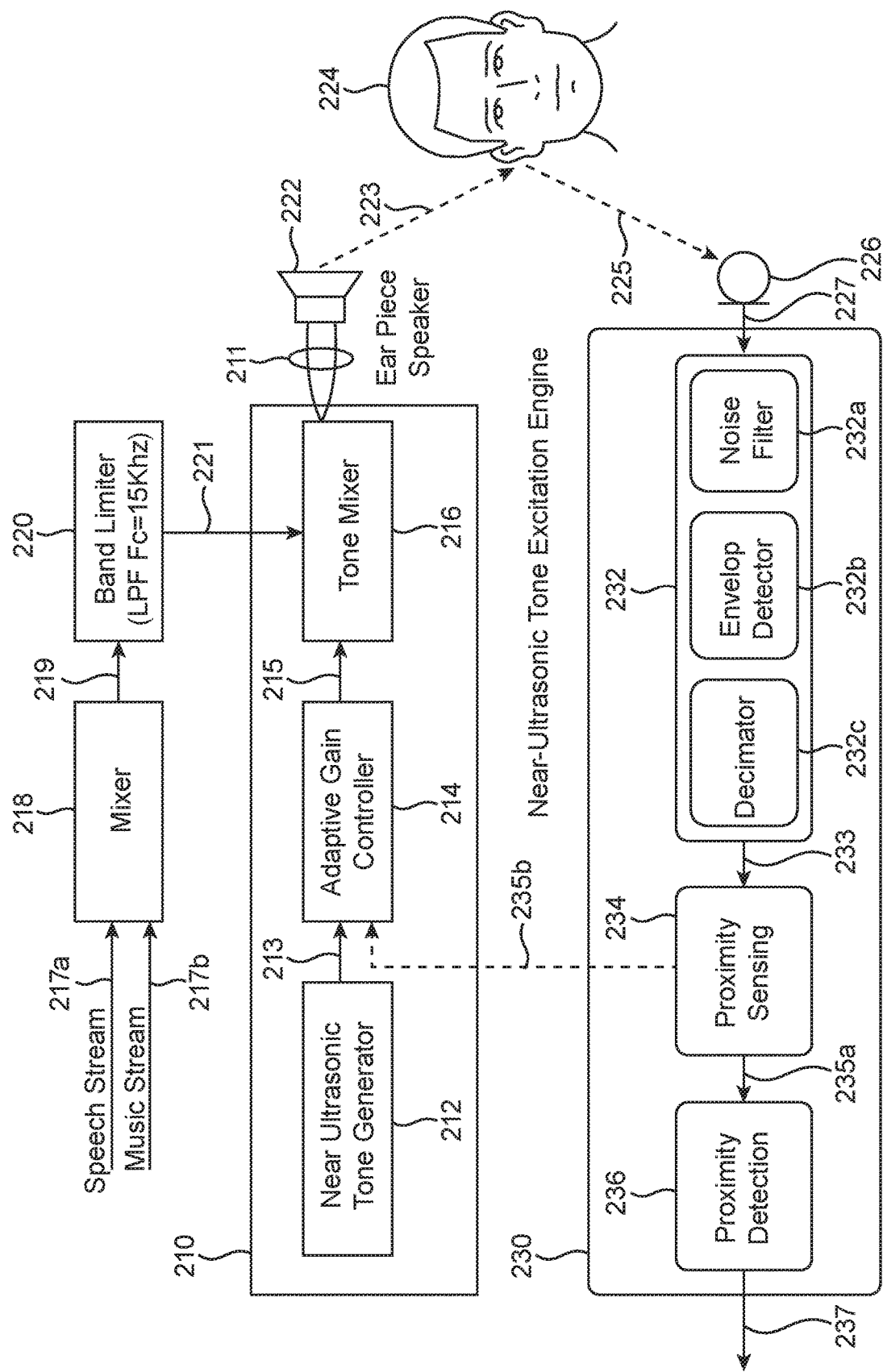
FIG. 2 illustrates block diagram of near-ultrasonic excitation and proximity computation engines according to one embodiment.

FIG. 2 illustrates block diagram 200 of near-ultrasonic excitation 210 and proximity computation 230 engines according to one embodiment. The excitation engine 210 includes a near-ultrasonic tone generator 212, an adaptive gain controller 214 and a tone mixer 216. The tone generator 212 produces an inaudible near-ultrasonic tone (e.g., 18 KHz) 213 having a signal power or gain that may be adaptively controlled by the gain controller 214 to produce a controlled near-ultrasonic tone 215 that may be combined in the mixer 216 with an audible signal 221 to produce a drive signal 211 for the EP speaker 222. Other elements of the host device include a mixer 218 for combining outgoing speech 217a and/or music 217b streams, and a band limiter (e.g., a lowpass filter) 220 for limiting the upper frequency range of the mixed signal(s) 219 to produce the audible signal 221.

The near-ultrasonic tone generation may be adaptively controlled by received signal energy of the echo waves 225 received and converted by the microphone 226 to signals 227 processed by the proximity computation engine 230. The waves 223 emitted from the EP speaker 222 are reflected by various obstacles in its path (including head/ face of the user 224) and are captured by the microphone 226 as echoes 225. These echoes are further processed to detect the proximity of the head/face.

The near-ultrasonic proximity computation engine 230 includes a preprocessing engine 232, a proximity sensing engine 234 and a proximity detection engine 236. Together, these perform adaptive acoustic sensing of the echo reflection profile as affected by acoustic properties of the operating environment (which may vary in real time based on sound absorption characteristics of surrounding materials, size of head, contours of face, etc.) and dynamically adapt the detection parameters (e.g., idle signal floor, sensitivity, thresholds, etc.). Ultimately, a detection algorithm may be used with configurable attack-hold-decay profiles to determine proximity accurately while minimizing false triggers.

Audio data captured by any of the front facing microphones 226 may be segmented or divided into frames of appropriate frame size (e.g., 10 msec). Each audio frame may be processed by a sequence of signal preprocessing modules to pre-amplify and remove noise and other low frequency signals (e.g., below 17 KHz). This may be advantageously done using a sixth order infinite impulse response (IIR) high pass filter (HPF) 232a along with a pre-amplifier to produce a resultant signal from having primarily echoes of the transmitted (and reflected) near ultrasonic tone (NUT). The echo signal from the HPF 232a may be further processed by an envelope generator 232b to extract an overall echo profile of the reflected signals 225. This envelope generation may be done using a signal squarer and low pass filter (LPF). The resultant envelop signal may be down-sampled to 240 Hz by a decimator 232c, which advantageously reduces computation complexity by a factor of 200 and enables low power computations.

The decimated echo envelope signal 233 may be further processed by the proximity sensing engine 234 using dynamic energy estimation (DEE). This DEE advantageously estimates mean energy of the echo envelope signal 233 for a predetermined time window (e.g., 100 msec) to determine an absolute standard deviation of the echo envelope signal 233 over the estimated mean energy. This beneficially ensures that the mean energy of the echo envelope signal 233 may be detected accurately notwithstanding variances that can be experienced due to the operating environment. (For example, the mean energy may vary depending upon whether the device is held in a hand of the user, placed upon a wooden tabletop or steel tabletop, placed in a pocket of the user, and so on, due to differences in sound absorption among such disparate materials.) Once the mean energy for the desired time window has been derived, the absolute standard deviation (ASD) of the echo envelope signal over the mean energy is generated as the output processed signal 235a. Additionally, a feedback signal 235b may be provided to the adaptive gain controller 214 in the NUT engine 210 to help ensure that drive signal 211 of a sufficient magnitude is provided in the EP speaker 222 based on the estimated mean energy.

The resultant absolute standard deviation (ASD) signal 235a may be further processed by the proximity detection (PD) engine 236 to determine (e.g., compute) the true proximities. This PD engine 236 may advantageously employ a detection technique based on a configurable attack-hold-decay algorithm to detect the proximity accurately while minimizing false triggers. Such configurable attack-hold-decay algorithm may employ an integrator core that accumulates envelope signal energy when the ASD is higher than a predetermined threshold and decays otherwise, and triggers final proximity events based on its internal states.

Figure 3:
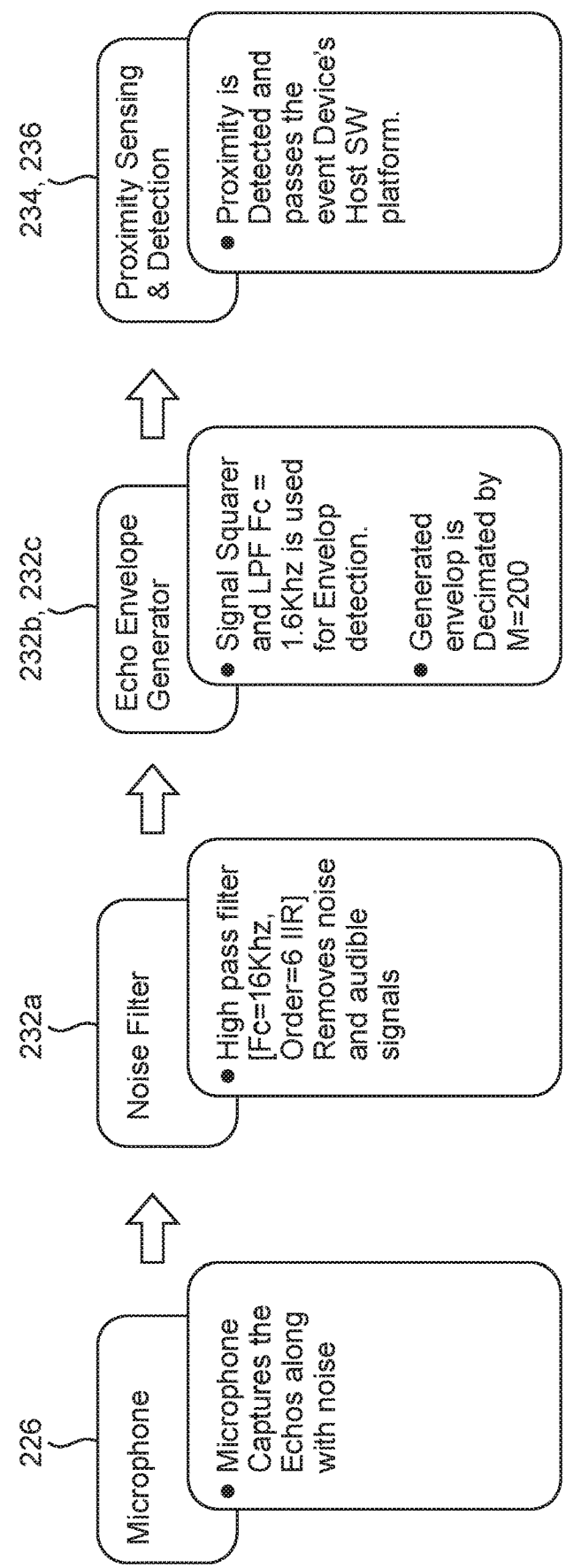
FIG. 3 illustrates operation flow for a near-ultrasonic proximity computation engine according to one embodiment.

FIG. 3 illustrates operation flow for a near-ultrasonic proximity computation engine according to one embodiment. As indicated, and discussed in more detail hereinabove, the microphone 226 captures echoes 225 along with noise, and the high pass filter 232a (e.g., a $6^{th}$ order IIR filter with a cutoff frequency of 16 Khz) removes noise and the lower frequency audible signals. The filtered signal may then be squared and filtered with a low pass filter (e.g., having a cutoff frequency of 1.6 Khz) for performing envelope detection 232b, followed by down-sampling with a decimator 232c by a factor M=200. The software platform of the host device may then be employed to perform the operations of the proximity sensing engine 234 and proximity detection engine 236.

Figure 4:
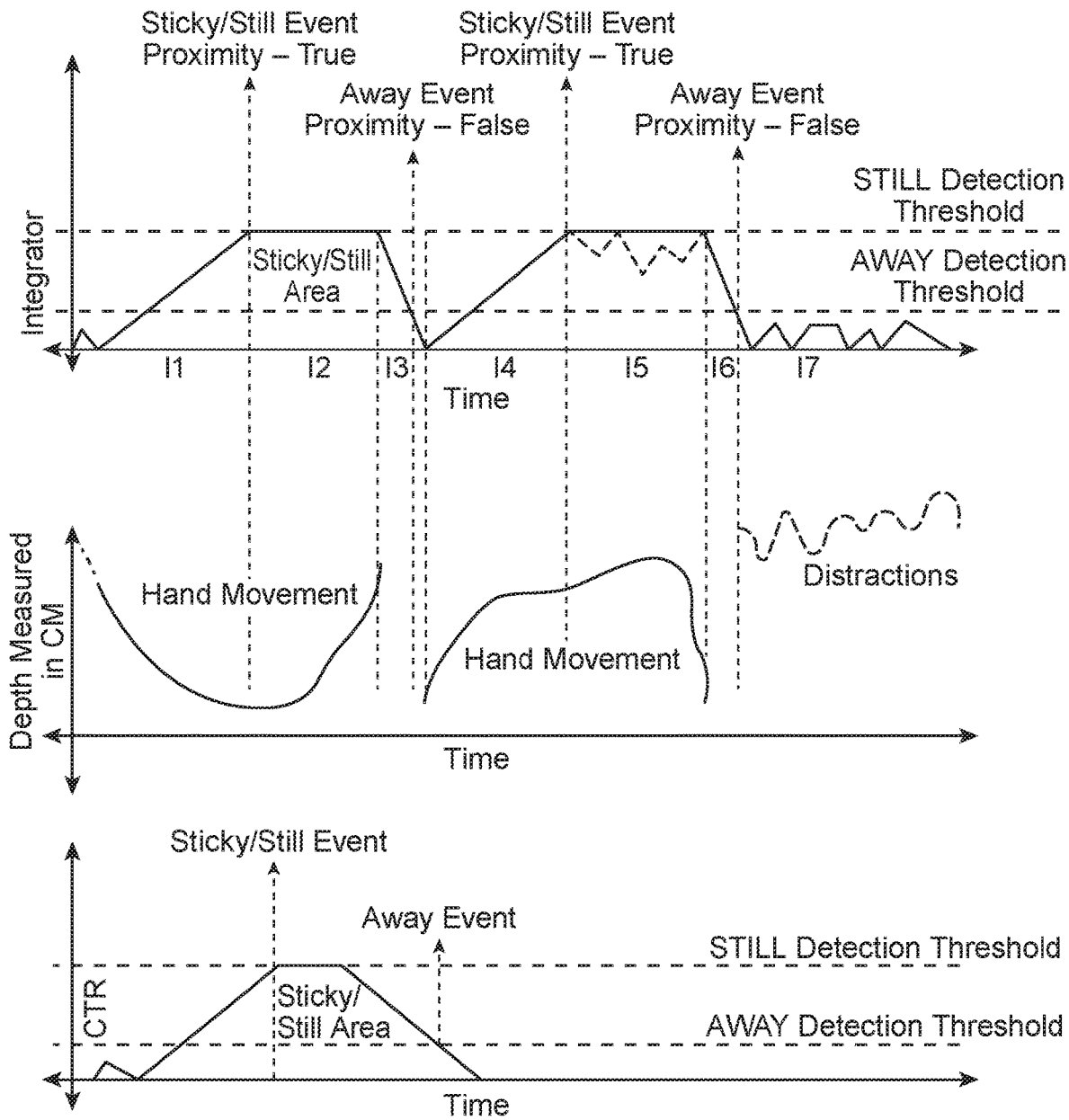
FIG. 4 illustrates an attack-hold-decay algorithm for proximity computation according to one embodiment.

FIG. 4 illustrates an attack-hold-decay algorithm for proximity computation according to one embodiment. This may be used for detecting and validating a computed proximity while effectively rejecting false detections. An integration of the ASD signal 235a during time interval I1 produces an inclining ramp which ramps up by a factor of PXDT_INC_FACTOR if the standard deviation of the envelope signal 233 transcends beyond a predetermined AWAY Detection Threshold. Otherwise, the integration produces a declining ramp that decays by a factor of PXDT_DEC_FACTOR, e.g., as seen during time interval I3. Proximity is detected as TRUE if the integration reaches a higher predetermined STILL Detection Threshold, e.g., as seen during time interval I2. Conversely, proximity is detected as FALSE if the integration decays below the lower AWAY Detection Threshold, e.g., as seen during time interval I3. The difference between the higher STILL Detection Threshold and lower AWAY Detection Threshold maintains a degree of hysteresis to minimize false triggers. The ramping up time needed for the integration to reach the upper STILL Detection Threshold also helps to minimize false triggers.

Constants associated with this process include: PXDT_INC_FACTOR=1 as the % Increment/Attack Factor; PXDT_DEC_FACTOR=0.2 as the % Decay Factor; PXDT_INC_THRLD_LEVEL=0.05 as the % Signal Level above which an Attack starts/continues and below which decay starts/continues; PXDT_MAX_STILL_DET_FLOOR=40 as the % Higher the Value slower will result in a STILL detection; and PXDT_MAX_AWAY_DET_FLOOR=20 as the % Away Detection Threshold.

Figure 5:
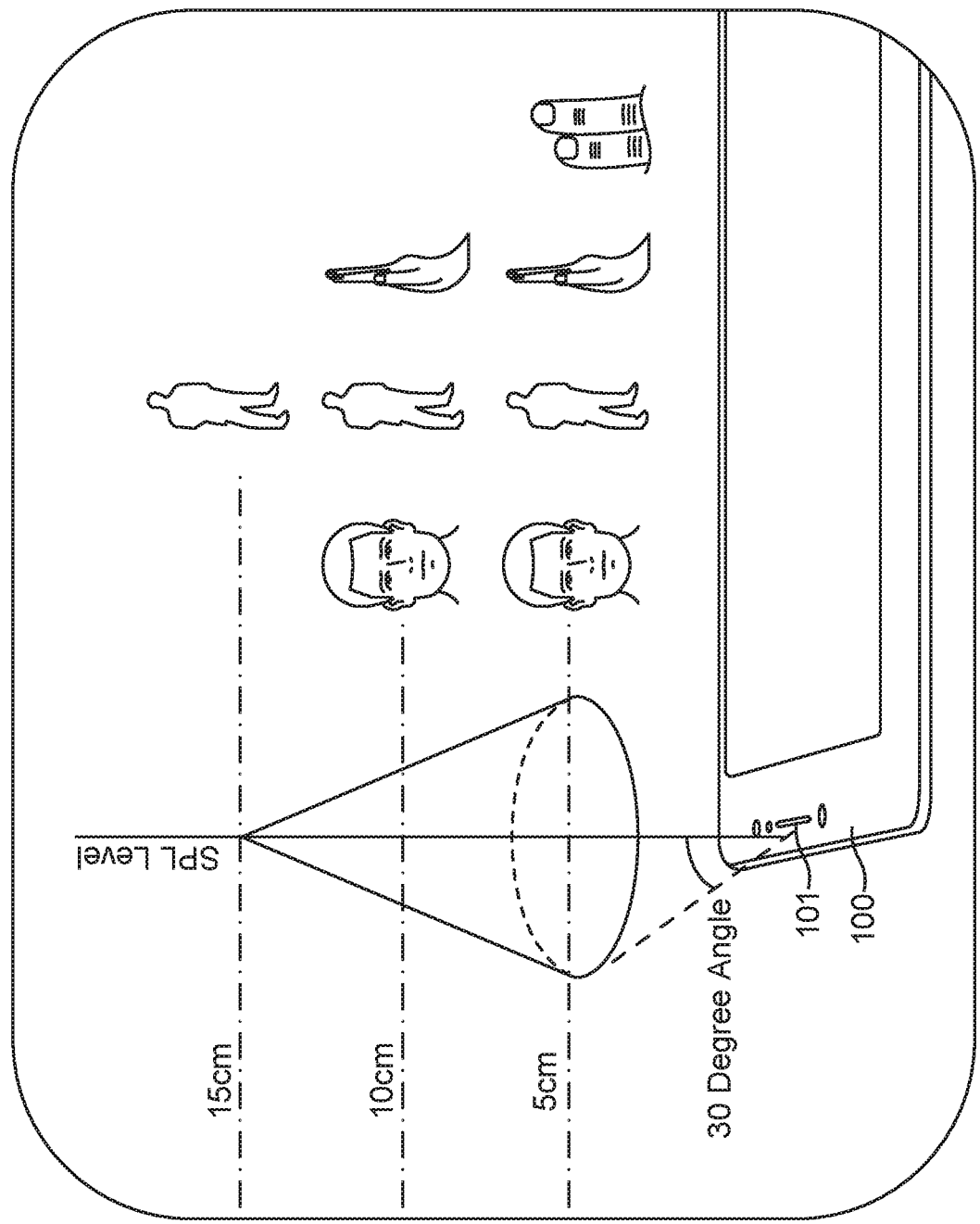
FIG. 5 illustrates test cases for different detection capabilities, distances and object sizes according to one embodiment.

FIG. 5 illustrates test cases for different detection capabilities, distances and object sizes according to one embodiment. Examples of test objects associated with a user were (as indicated) a head, a torso, a hand and two fingers. For one example test using a technique as described above, location relative to the EP speaker 101 of the device 100 was accurately validated as far away as 5 cm for all objects (head, torso, hand and fingers), 10 cm for larger objects (head, torso and hand), and 15 cm for only the largest object (torso).

Figure 6:
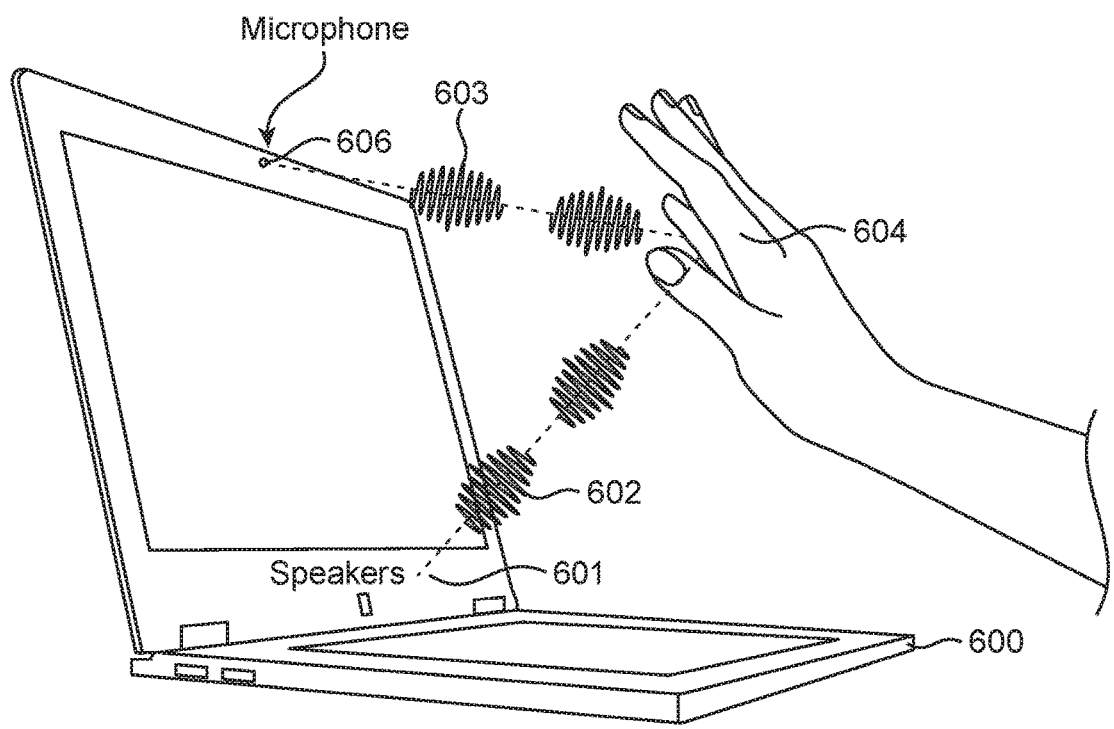
FIG. 6 illustrates use of proximity sensing for wake-on gesturing with a mobile device according to one embodiment.

FIG. 6 illustrates use of proximity sensing for wake-on gesturing with a mobile device according to one embodiment. Similar to the use case for a mobile communication device, such as telephone handset 100 (FIG. 1), proximity sensing as described herein may be advantageously used for enabling wake-on gesturing of a computing device 600, such a mobile or desktop computer (though perhaps more advantageously for a mobile device which, for purposes of preserving battery life, will enable dimming or closing of the display following prescribed intervals of inactivity). As with the previous example, a near ultrasonic signal 602 emitted from an EP speaker 601 of the device 600 may be directed (e.g., beam formed) toward a designated area in front of the display and in which a hand 604 of the user is expected to gesture. The high frequency (HF) sound waves 603 reflect from the hand 104 and are captured as echoes by the built-in microphone 606. The strength of the echoes 603 is proportional to the proximity of the hand 604, and the energy of the reflected HF sound may be used is a cue for detecting and confirming that proximity.

Figure 7:
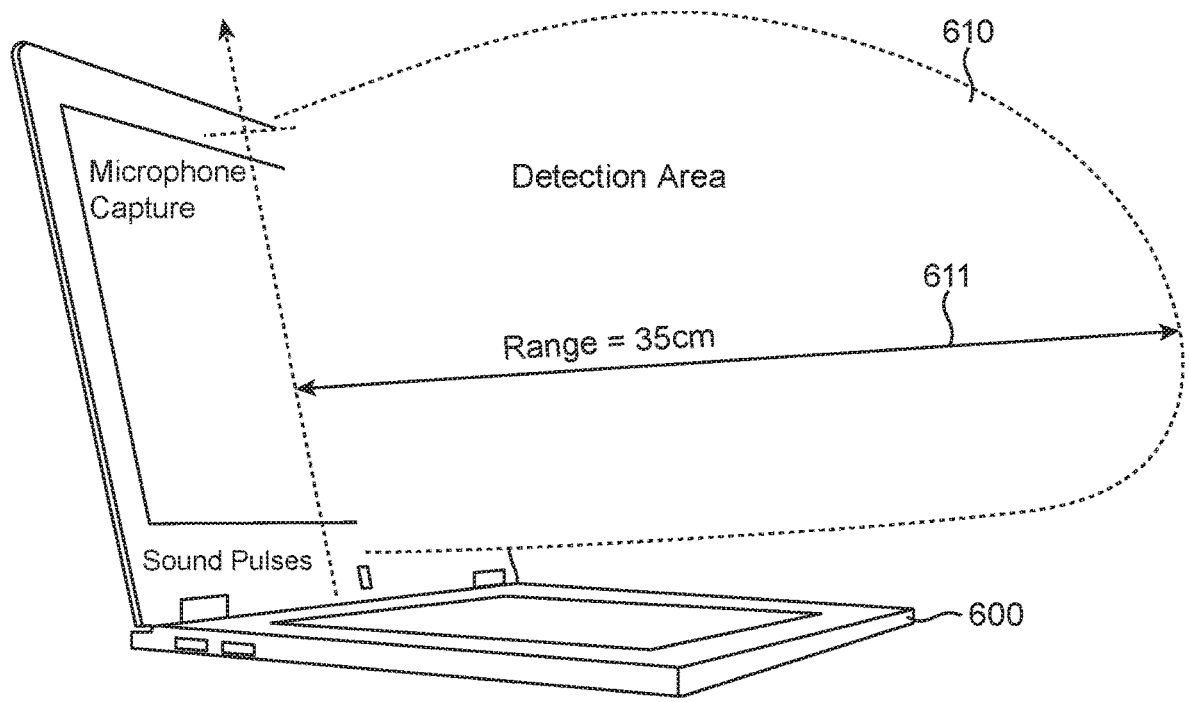
FIG. 7 illustrates an area and range for detection of wake-on gesturing with a mobile device according to one embodiment.

FIG. 7 illustrates an area and range for detection of wake-on gesturing with a mobile device according to one embodiment. As noted above, a near ultrasonic signal 602 emitted from an EP speaker 601 of the device 600 may be directed toward a designated area 610 with a predetermined range 611 in front of the display and in which a hand 604 of the user is expected to gesture.

In this use case, the inbuilt PC speakers 601 emit near ultrasonic pulses for use in determining the presence of an object within the detection area 610. Similar to the tone example, the emitted pulses create echoes from nearby objects and may be detected by the inbuilt microphones 606. The received signal contains echo profiles of all detected objects and may be processed further to extract the presence of a hand 604 (or virtually any other object as desired to perform a wake-on operation). The strength of the echo is proportional to the size of the object and inversely proportional to its distance from the speakers 601. The presence of the hand 604 may be detected by evaluating features like sensed depth and strength of the reflected signal strength corresponding to a hand size with sufficient hold time.

Typical operation may begin when the device 600 has entered an IDLE state (e.g., following some prescribed interval of little or no user interaction with the device 600). During this state, the device 600 emits the near ultrasonic pulses 602 via the speaker(s) 601 and listens for echoes 603 via the microphone(s) 606. In response to reception of echoes, the device 600 performs proximity sensing and detection operations to detect and confirm the presence of a hand 604. Upon a successful detection, the device 600 transitions from an IDLE state to a WAKE state, following which the user may perform further authentication procedures to access features and operations of the device 600.

As discussed in more detail below, two major device subsystems may be employed: a near ultrasonic pulse excitation engine, and a depth sensing (DS) and proximity detection (PD) engine.

Near ultrasonic pulses 602 are emitted by the PC speakers 601. The pulses 602 may be shaped in such a way that there are sufficient ramp up and ramp down times to ensure that they remain inaudible to the user. In accordance with one embodiment, the pulses 602 may have a 20 KHz nominal center frequency, 400 usec pulse-durations and eight repetitions per second for a repetition interval of 125 msec. Such a low repetition interval ensures that the speaker 601 actively emits sound waves only 0.66% and remains idle 99.3% of the time, thereby minimizing uses of power from the host device 600. However, the repetition rate may be increased, albeit with added power consumption and computations. While various pulse shaping techniques may be used, it was found that distortions created at the output may be minimized by using a pulse shaping technique based on auto-correlation. Such near ultrasonic pulse generation and shaping may be described as follows:

$$\text{Base Tone: } x[n] = A \sin(2\pi(f/(Fs))n) \quad (A)$$

Where: Excitation Frequency (f)=20 KHz
Sampling Frequency (Fs)=48 KHz
Signal Length n=0→10 pulses per second $$\text{Auto-correlation and Scaling: } x1[n] = x[n] \otimes x[n] \quad (B)$$

$$\text{ScaleFactor: Max}(x1[n])/2 \quad (C)$$

$$\text{Final pulse: } y[n] = x1[n]/\text{ScaleFactor} \quad (D)$$

Figure 8:
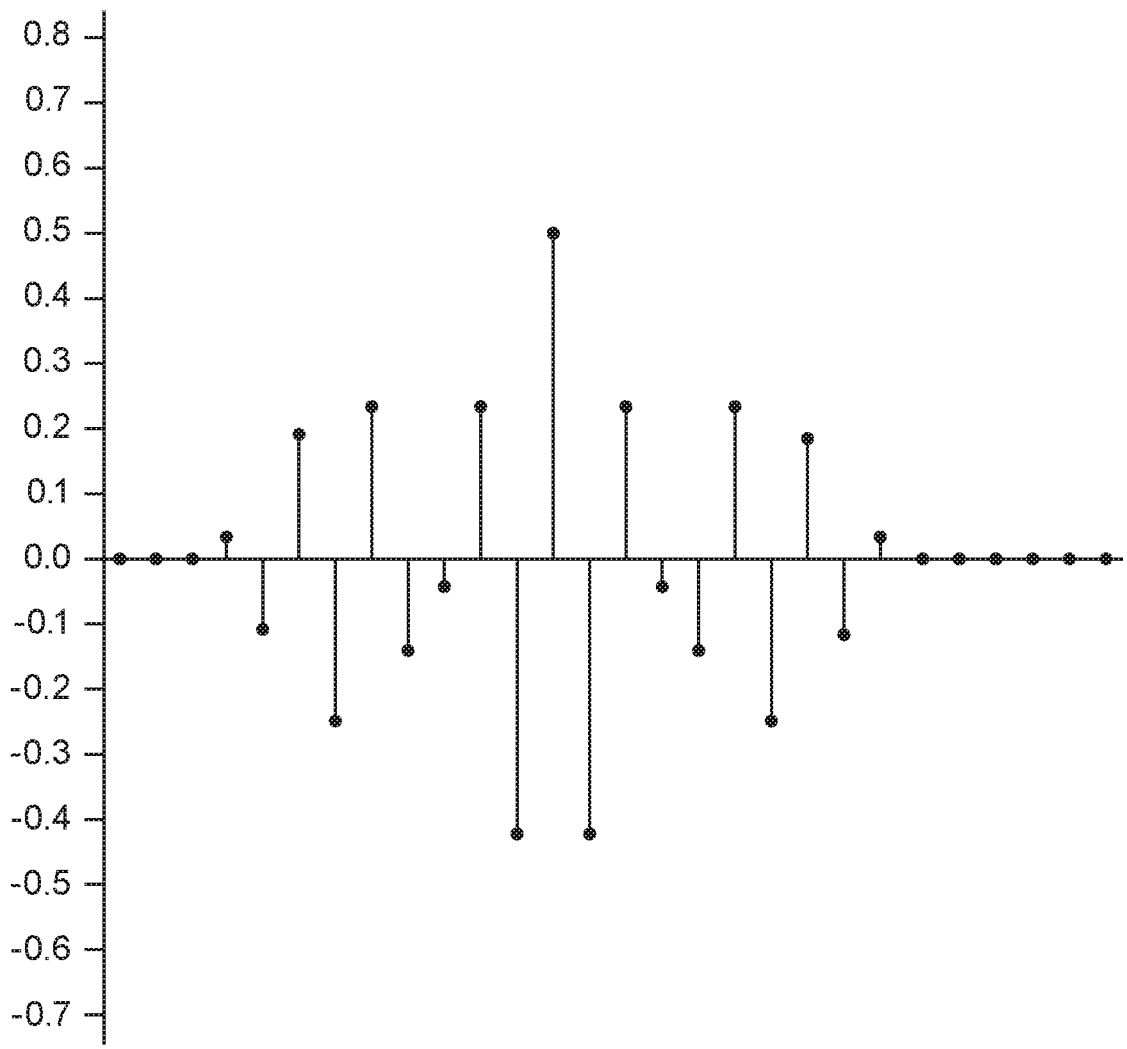
FIG. 8 illustrates a magnitude versus time graph for a near-ultrasonic pulse according to one embodiment.

FIG. 8 illustrates a magnitude versus time graph 800 for near-ultrasonic pulse as described above according to one embodiment.

Figure 9:
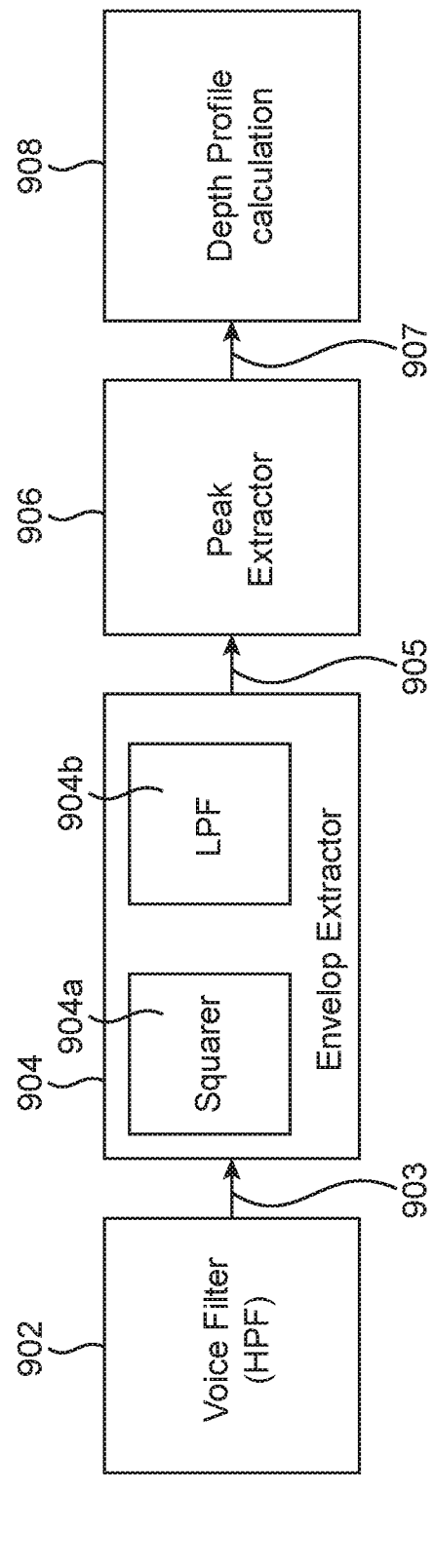
FIG. 9 illustrates a block diagram of a near-ultrasonic proximity computation engine according to another embodiment.

FIG. 9 illustrates a block diagram of a near-ultrasonic proximity computation engine 900 according to another embodiment. A depth sensing (DS) engine and proximity detection (PD) engine analyzes the reflected near ultrasonic pulses that together form an echo profile signal which is the sum of all echoes. The inbuilt microphone receives the transmitted pulses as well as the echo profile signal. The microphone also listens to the environment sound including music, speech and noise which spans the complete audio spectrum. A depth sensing technique may be used to remove noise and detect the echo signals for processing. The DS engine further performs many checks to confirm that primarily echo signals are being analyzed and calculates the depth for the detected object.

The DS engine and PD engine work on captured audio data using any of the front facing microphones and will segment such data into frames of appropriate frame size (e.g., 10 msec). Each audio frame is processed by a sequence of signal preprocessing modules to pre-amplify and remove noise and other low frequency signals (e.g., below 18 KHz) from the data segments. This may be done using a sixth order IIR high pass filter (HPF) along with a pre-amplifier 902. The resultant filtered signal 903 retains primarily echoes of transmitted pulses.

The filtered echo signal 903 is processed further by envelope extractor (EE) engine 904 to extract an overall echo profile of the reflected signals. This envelope generation may be done by a signal squarer [abs(x[n])] 904a and a low pass filter 904b (e.g., with a 6.4 Khz cutoff frequency). Once the envelop of echoes is generated, the resultant signal 905 may be down-sampled to a 24 KHz signal to reduce computation complexity by a factor of two and thereby enable low power computations.

Once the envelop signal has been derived from the EE engine 904, the envelope signal 905 is processed by a peak extractor (PE) engine 906 to detect peaks in the echo profile signal which can be used for echo detection. A technique for finding the peaks in the echo profile may be implemented to analyze echo signal characteristics as follows:

$$\text{Peak } [n] = (x[n], x[n] - x[n-dt] > m \text{ and } x[n] - x[n+dt] > m$$

0, Otherwise
Where: dt=Stride value
m=Amplitude difference across peak

Figure 10:
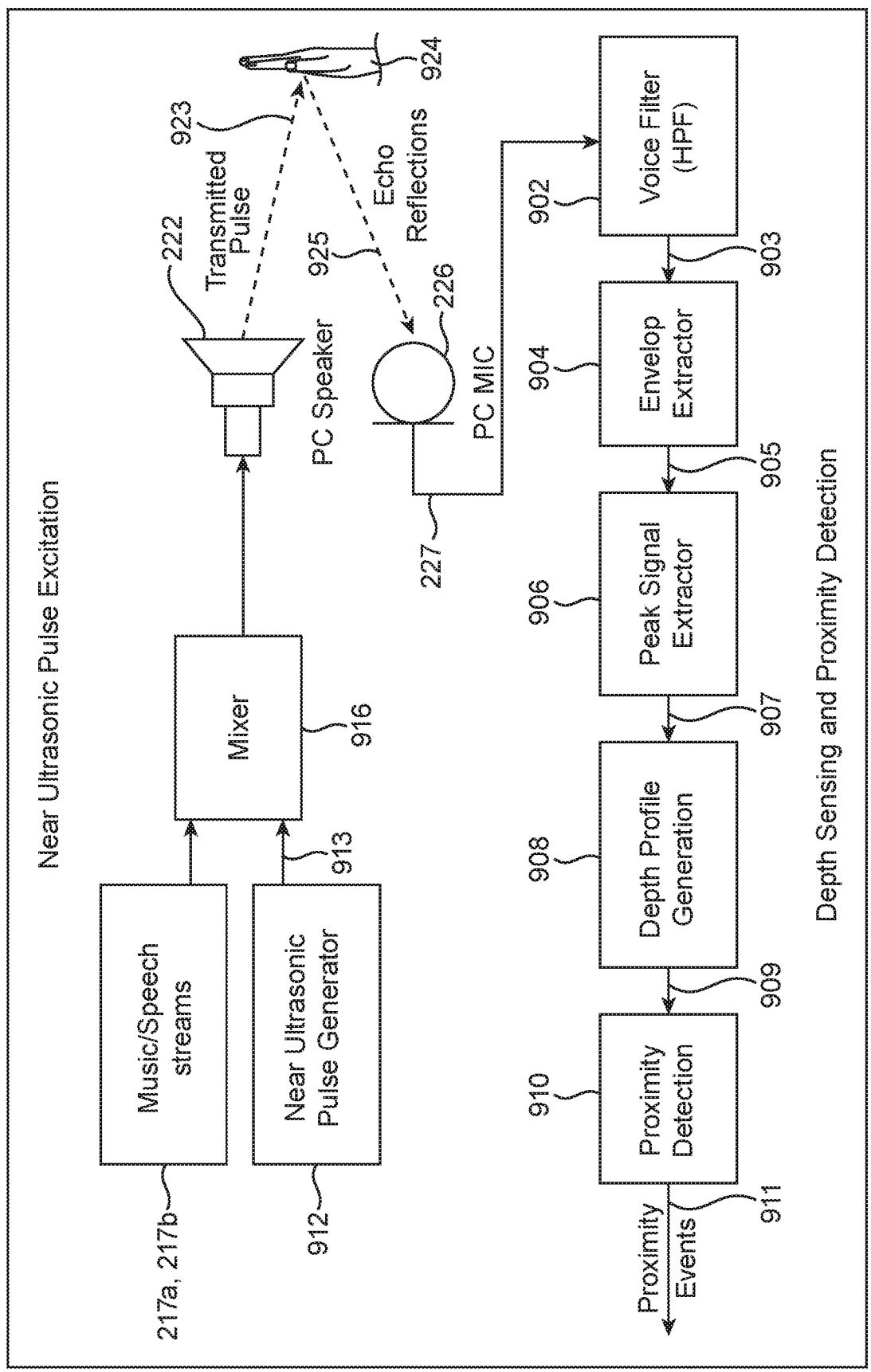
FIG. 10 illustrates block diagrams of near-ultrasonic excitation and proximity computation engines according to another embodiment.

FIG. 10 illustrates block diagrams of near-ultrasonic excitation and proximity computation engines according to another embodiment. The peaks of the echo profile signal extracted from the PE engine 906 may be further processed by a depth profile calculation engine 908 that extracts and validates the echoes, and calculates depth information associated with the selected echo.

The input 907 of the depth profile calculation engine 908 contains peaks corresponding to the pulsed excitation signal, noise peaks and echo peaks. The depth profile calculation engine 908 locks to the periodic pulse excitation signal to find the relevant echoes corresponding to the particular pulse excitation. This operation of DPM may be described as follows: (1) The reference pulse excitation signal from near ultrasonic pulse excitation generator engine 912 is determined from among the remaining signals; (2) echoes with respect to the reference signal are determined; (3) the most prominent echo signal is selected; and (4) the time difference between the reference pulse signal and echo signal which is proportional to the depth of the object detected is derived.

Similar to the example discussed above, the proximity detection (PD) engine 910 performs proximity detection based on a configurable attack-hold-decay algorithm to detect the proximity accurately while minimizing false triggers. As previously discussed, this attack-hold-decay process performs an integration that accumulates envelope signal energy when the ASD is higher than a predetermined threshold and decays otherwise, and triggers proximity events based on its internal states.

Figure 11:
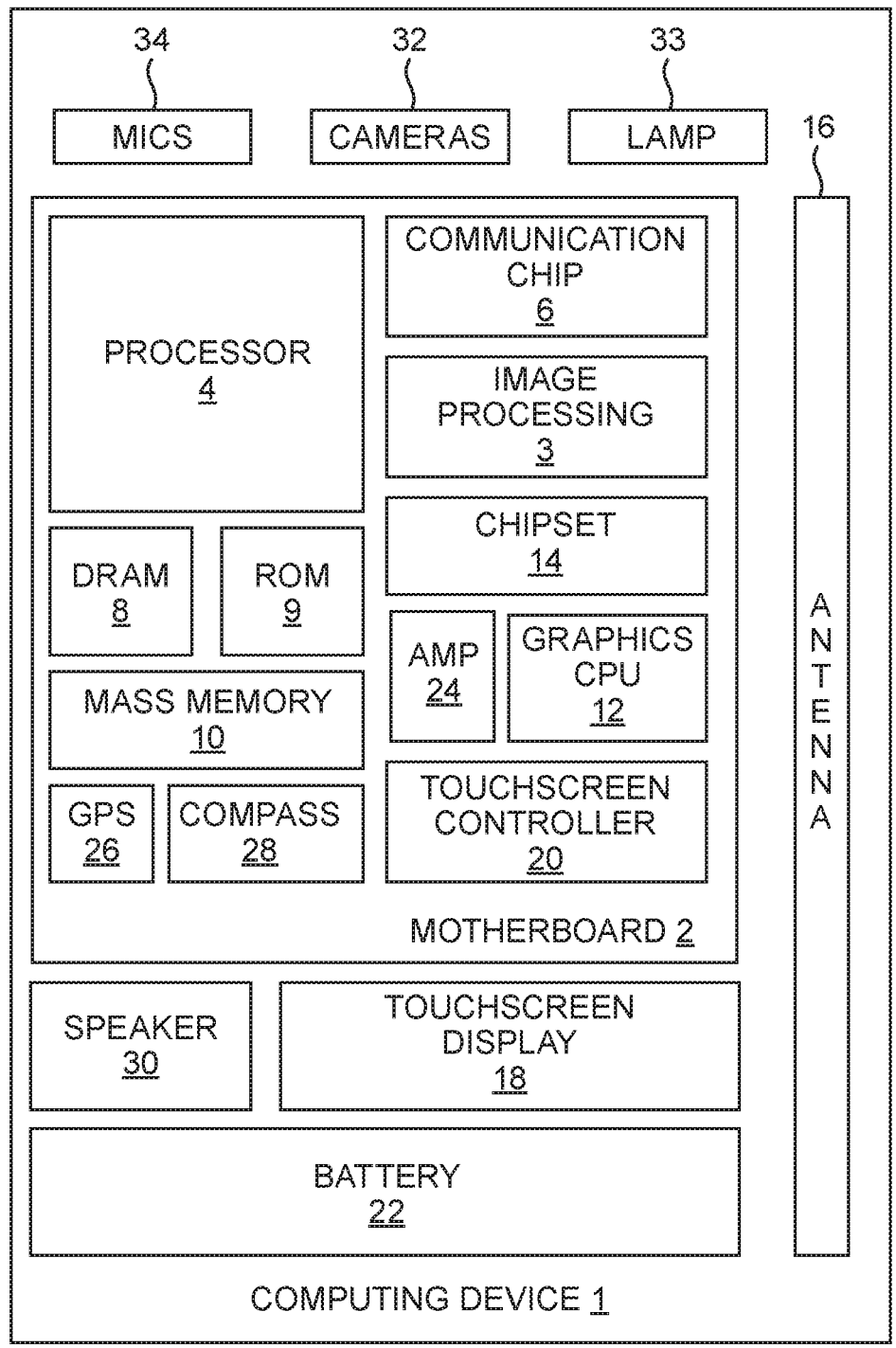
FIG. 11 illustrates a block diagram of a mobile device in the form of a computing device according to one embodiment.

FIG. 11 illustrates a block diagram of a mobile device in the form of a computing device 1 according to one embodiment. The computing device 1 may house a system board 2 that may include a number of components, including, without limitation, to a processor 4 and at least one communication package 6. The communication package 6 may be coupled to one or more antennas 16. The processor 4 may be physically as well as electrically coupled to the board 2.

Depending on its applications, computing device 1 may include other components that may or may not be physically and electrically coupled to the board 2. These other components include, without limitation, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 (e.g., a touchscreen), a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, a camera 32, a lamp 33, a microphone array 34, and a mass storage device (such as a hard disk drive) 10, compact disk (CD) drive (not shown), digital versatile disk (DVD) drive (not shown), and so forth. These components may be connected to the system board 2, mounted to the system board, or combined with any of the other components.

The communication package 6 enables wireless and/or wired communications for the transfer of data to and from the computing device 1. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 1 may include multiple communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

The cameras 32 may contain image sensors with pixels or photodetectors, and may use resources of an image processing chip 3 to read values and also to perform exposure control, depth map determination, format conversion, coding and decoding, noise reduction and 3D mapping, etc. The processor 4 is coupled to the image processing chip to drive the processes, set parameters, etc.

In various implementations, the computing device 1 may be eyewear, a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, a digital video recorder, wearables or drones. The computing device may be fixed, portable, or wearable. In further implementations, the computing device 1 may be any other electronic device that processes data. Embodiments may be further implemented as a part of one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the foregoing and following description and the following claims, the term "coupled" along with its derivatives, may be used. "Coupled" is used to indicate that two or more elements cooperate or interact with each other, but they may or may not have intervening physical or electrical components between them.

As used in the claims, unless otherwise specified, the use of the ordinal adjectives "first", "second", "third", etc., to describe a similar element, merely indicate that different instances of such elements are being recited, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of operation described herein may be changed and are not limited to the manner described herein. Moreover, actions of any operation flow need not be implemented in the order described, nor do all actions necessarily need to be performed. Also, those actions that are not dependent on other actions may be performed in parallel with the other actions.

Method examples described herein may be implemented, at least in part, with nor or more machines or computing devices. Some examples may include a computer-readable medium or machine-readable medium encoded with instructions operable to configure an electronic device to perform methods as described in the examples disclosed herein. An example implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, without limitation, hard disks, removable magnetic disks, removable optical disks (e.g., compact disks and digital video disks), magnetic cassettes, memory cards or sticks, random access memory (RAM), read only memory (ROM), and the like.

The following examples pertain to further embodiments. The various features of the different embodiments may be variously combined with some features included and others excluded to suit a variety of different applications.

Some embodiments pertain to a mobile device, comprising: an acoustic signal excitation engine configured to produce a plurality of acoustic signals including a near ultrasonic acoustic signal; a first electromechanical transducer coupled to the acoustic signal excitation engine and responsive to the plurality of acoustic signals by producing a plurality of outgoing acoustic waves including an outgoing near ultrasonic acoustic wave related to the near ultrasonic acoustic signal; a second electromechanical transducer responsive to a plurality of incoming acoustic waves including an incoming near ultrasonic acoustic wave related to an echo of the outgoing near ultrasonic acoustic wave by producing a plurality of incoming acoustic signals; and a proximity computing engine coupled to the second electromechanical transducer and responsive to the plurality of incoming acoustic signals by producing at least one status signal related to the incoming near ultrasonic acoustic wave and indicative of a proximity of the second electromechanical transducer to an object from which the incoming near ultrasonic acoustic wave was received.

In further embodiments, the near ultrasonic acoustic signal comprises a tone having a nominal frequency within a frequency range of 17-24 kilohertz.

In further embodiments, the acoustic signal excitation engine comprises: a near ultrasonic tone generator to produce a near ultrasonic tone as the near ultrasonic acoustic signal; and an acoustic signal mixer responsive to a speech signal by mixing the speech signal and the near ultrasonic tone to produce the plurality of acoustic signals.

In further embodiments, the near ultrasonic acoustic signal comprises a pulse stream having a center frequency within a frequency range of 17-24 kilohertz, a pulse duration and a pulse repetition interval, the pulse duration is substantially less than the pulse repetition interval.

In further embodiments, the acoustic signal excitation engine comprises: a near ultrasonic pulse generator to produce a near ultrasonic pulse stream as the near ultrasonic acoustic signal; and an acoustic signal mixer responsive to a speech signal by mixing the speech signal and the near ultrasonic pulse stream to produce the plurality of acoustic signals.

In further embodiments, the proximity computing engine comprises: a preprocessing engine responsive to the plurality of incoming acoustic signals by producing an echo signal that includes a primary signal component related to the incoming near ultrasonic acoustic wave and one or more additional signal components related to other ones of the plurality of incoming acoustic signals, wherein a magnitude of the primary signal component is substantially greater than a magnitude of the one or more additional signal components; and a signal integration engine coupled to the preprocessing engine and responsive to the echo signal by producing the at least one status signal in accordance with an attack-hold-decay integration of the echo signal.

Some embodiments pertain to a mobile device, comprising: signal excitation means for producing a plurality of acoustic signals including a near ultrasonic acoustic signal; first transducer means for responding to the plurality of acoustic signals by producing a plurality of outgoing acoustic waves including an outgoing near ultrasonic acoustic wave related to the near ultrasonic acoustic signal; second transducer means for responding to a plurality of incoming acoustic waves including an incoming near ultrasonic acoustic wave related to an echo of the outgoing near ultrasonic acoustic wave by producing a plurality of incoming acoustic signals; and proximity computing means for responding to the plurality of incoming acoustic signals by producing at least one status signal related to the incoming near ultrasonic acoustic wave and indicative of a proximity of the second electromechanical transducer to an object from which the incoming near ultrasonic acoustic wave was received.

In further embodiments, the near ultrasonic acoustic signal comprises a tone having a nominal frequency within a frequency range of 17-24 kilohertz.

In further embodiments, the signal excitation means comprises: tone generator means for producing a near ultrasonic tone as the near ultrasonic acoustic signal; and signal mixer means for responding to a speech signal by mixing the speech signal and the near ultrasonic tone to produce the plurality of acoustic signals.

In further embodiments, the near ultrasonic acoustic signal comprises a pulse stream having a center frequency within a frequency range of 17-24 kilohertz, a pulse duration and a pulse repetition interval, the pulse duration is substantially less than the pulse repetition interval.

In further embodiments, the signal excitation means comprises: pulse generator means for producing a near ultrasonic pulse stream as the near ultrasonic acoustic signal; and signal mixer means for responding to a speech signal by mixing the speech signal and the near ultrasonic pulse stream to produce the plurality of acoustic signals.

In further embodiments, the proximity computing means comprises: preprocessing means for responding to the plurality of incoming acoustic signals by producing an echo signal that includes a primary signal component related to the incoming near ultrasonic acoustic wave and one or more additional signal components related to other ones of the plurality of incoming acoustic signals, wherein a magnitude of the primary signal component is substantially greater than a magnitude of the one or more additional signal components; and integration means for responding to the echo signal by producing the at least one status signal in accordance with an attack-hold-decay integration of the echo signal.

Some embodiments pertain to a method of operating a mobile device, comprising: generating a plurality of acoustic signals including a near ultrasonic acoustic signal; converting the plurality of acoustic signals to a plurality of outgoing acoustic waves including an outgoing near ultrasonic acoustic wave related to the near ultrasonic acoustic signal; converting a plurality of incoming acoustic waves including an incoming near ultrasonic acoustic wave related to an echo of the outgoing near ultrasonic acoustic wave to a plurality of incoming acoustic signals; and processing the plurality of incoming acoustic signals to produce at least one status signal related to the incoming near ultrasonic acoustic wave and indicative of a proximity of the second electromechanical transducer to an object from which the incoming near ultrasonic acoustic wave was received.

In further embodiments, the near ultrasonic acoustic signal comprises a tone having a nominal frequency within a frequency range of 17-24 kilohertz.

In further embodiments, the generating a plurality of acoustic signals including a near ultrasonic acoustic signal comprises: generating a near ultrasonic tone as the near ultrasonic acoustic signal; and mixing a speech signal and the near ultrasonic tone to produce the plurality of acoustic signals.

In further embodiments, the near ultrasonic acoustic signal comprises a pulse stream having a center frequency within a frequency range of 17-24 kilohertz, a pulse duration and a pulse repetition interval, the pulse duration is substantially less than the pulse repetition interval.

In further embodiments, the generating a plurality of acoustic signals including a near ultrasonic acoustic signal comprises: generating a near ultrasonic pulse stream as the near ultrasonic acoustic signal; and mixing a speech signal and the near ultrasonic pulse stream to produce the plurality of acoustic signals.

In further embodiments, the processing the plurality of incoming acoustic signals to produce at least one status signal comprises: preprocessing the plurality of incoming acoustic signals to produce an echo signal that includes a primary signal component related to the incoming near ultrasonic acoustic wave and one or more additional signal components related to other ones of the plurality of incoming acoustic signals, wherein a magnitude of the primary signal component is substantially greater than a magnitude of the one or more additional signal components; and integrating the echo signal by to produce the at least one status signal in accordance with an attack-hold-decay integration of the echo signal.

The above description illustrates various embodiments of the present disclosure along with examples of how aspects of the particular embodiments may be implemented. The above examples should not be deemed to be the only embodiments and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A mobile device, comprising:
an acoustic signal excitation engine configured to produce a plurality of acoustic signals including a near ultrasonic acoustic signal;
a first electromechanical transducer coupled to said acoustic signal excitation engine and responsive to said plurality of acoustic signals by producing a plurality of outgoing acoustic waves including an outgoing near ultrasonic acoustic wave related to said near ultrasonic acoustic signal;
a second electromechanical transducer responsive to a plurality of incoming acoustic waves including an incoming near ultrasonic acoustic wave related to an echo of said outgoing near ultrasonic acoustic wave by producing a plurality of incoming acoustic signals; and
a proximity computing engine coupled to said second electromechanical transducer and responsive to said plurality of incoming acoustic signals by producing at least one status signal related to said incoming near ultrasonic acoustic wave and indicative of a proximity of said second electromechanical transducer to an object from which said incoming near ultrasonic acoustic wave was received, wherein the proximity computing engine performs an attack-hold-decay integration of a signal corresponding to one or more echoes of the outgoing near ultrasonic acoustic wave, to produce a status signal having multiple portions respectively spanning multiple time periods, the multiple portions including a level portion at a still detection threshold over a time period;
wherein proximity is reported when the attack-hold-decay integration to produce the status signal reaches the level portion at the still detection threshold during the time period.

2. The mobile device of claim 1, wherein said near ultrasonic acoustic signal comprises a tone having a nominal frequency within a frequency range of 17-24 kilohertz.

3. The mobile device of claim 1, wherein said acoustic signal excitation engine comprises:
a near ultrasonic tone generator to produce a near ultrasonic tone as said near ultrasonic acoustic signal; and
an acoustic signal mixer responsive to a speech signal by mixing said speech signal and said near ultrasonic tone to produce said plurality of acoustic signals.

4. The mobile device of claim 1, wherein said near ultrasonic acoustic signal comprises a pulse stream having a center frequency within a frequency range of 17-24 kilohertz, a pulse duration and a pulse repetition interval, wherein said pulse duration is substantially less than said pulse repetition interval.

5. The mobile device of claim 1, wherein said acoustic signal excitation engine comprises:
a near ultrasonic pulse generator to produce a near ultrasonic pulse stream as said near ultrasonic acoustic signal; and
an acoustic signal mixer responsive to a speech signal by mixing said speech signal and said near ultrasonic pulse stream to produce said plurality of acoustic signals.

6. The mobile device of claim 1, wherein said proximity computing engine comprises:
a preprocessing engine responsive to said plurality of incoming acoustic signals by producing an echo signal that includes a primary signal component related to said incoming near ultrasonic acoustic wave and one or more additional signal components related to other ones of said plurality of incoming acoustic signals, wherein a magnitude of said primary signal component is substantially greater than a magnitude of said one or more additional signal components; and
a signal integration engine coupled to said preprocessing engine and responsive to said echo signal to produce said at least one status signal having multiple portions, in accordance with the attack-hold-decay integration of said echo signal, wherein the multiple portions include a first portion that ramps up pass an away detection threshold towards the still detection threshold over a first time period, followed by a second portion that is the level portion at the still detection threshold over a second time period that is said time period, and follow by a third portion that ramps down from the still detection threshold towards the away detection threshold over a third time period.

7. A mobile device, comprising:
signal excitation means for producing a plurality of acoustic signals including a near ultrasonic acoustic signal;
first transducer means for responding to said plurality of acoustic signals by producing a plurality of outgoing acoustic waves including an outgoing near ultrasonic acoustic wave related to said near ultrasonic acoustic signal;

second transducer means for responding to a plurality of incoming acoustic waves including an incoming near ultrasonic acoustic wave related to an echo of said outgoing near ultrasonic acoustic wave by producing a plurality of incoming acoustic signals; and proximity computing means for responding to said plurality of incoming acoustic signals by producing at least one status signal related to said incoming near ultrasonic acoustic wave and indicative of a proximity of said second transducer means to an object from which said incoming near ultrasonic acoustic wave was received, wherein said proximity computing means comprises:

preprocessing means for responding to said plurality of incoming acoustic signals by producing an echo signal that includes a primary signal component related to said incoming near ultrasonic acoustic wave and one or more additional signal components related to other ones of said plurality of incoming acoustic signals, wherein a magnitude of said primary signal component is substantially greater than a magnitude of said one or more additional signal components; and integration means for responding to said echo signal by producing said at least one status signal that include multiple portions respectively spanning multiple time periods, in accordance with an attack-hold-decay integration of said echo signal, the multiple portions including a level portion at a still detection threshold over a time period;

wherein proximity is reported when the attack-hold-decay integration to produce the status signal reaches the level portion at the still detection threshold during the time period.

8. The mobile device of claim 7, wherein said near ultrasonic acoustic signal comprises a tone having a nominal frequency within a frequency range of 17-24 kilohertz.

9. The mobile device of claim 7, wherein said signal excitation means comprises:

tone generator means for producing a near ultrasonic tone as said near ultrasonic acoustic signal; and signal mixer means for responding to a speech signal by mixing said speech signal and said near ultrasonic tone to produce said plurality of acoustic signals.

10. The mobile device of claim 7, wherein said near ultrasonic acoustic signal comprises a pulse stream having a center frequency within a frequency range of 17-24 kilohertz, a pulse duration and a pulse repetition interval, said pulse duration is substantially less than said pulse repetition interval.

11. The mobile device of claim 7, wherein said signal excitation means comprises:

pulse generator means for producing a near ultrasonic pulse stream as said near ultrasonic acoustic signal; and signal mixer means for responding to a speech signal by mixing said speech signal and said near ultrasonic pulse stream to produce said plurality of acoustic signals.

12. A method of operating a mobile device, comprising:

generating a plurality of acoustic signals including a near ultrasonic acoustic signal;

converting said plurality of acoustic signals to a plurality of outgoing acoustic waves including an outgoing near ultrasonic acoustic wave related to said near ultrasonic acoustic signal;

converting a plurality of incoming acoustic waves including an incoming near ultrasonic acoustic wave related to an echo of said outgoing near ultrasonic acoustic wave to a plurality of incoming acoustic signals; and processing said plurality of incoming acoustic signals to produce at least one status signal related to said incoming near ultrasonic acoustic wave and indicative of a proximity of an electromechanical transducer to an object from which said incoming near ultrasonic acoustic wave was received, wherein said processing comprises performing an attack-hold-decay integration of a signal corresponding to one or more echoes of the outgoing near ultrasonic acoustic wave to produce a status signal having multiple portions respectively spanning multiple time periods, the multiple portions including a level portion at a still detection threshold over a time period;

wherein proximity is reported when the attack-hold-decay integration to produce the status signal reaches the level portion at the still detection threshold during the time period.

13. The method of claim 12, wherein said near ultrasonic acoustic signal comprises a tone having a nominal frequency within a frequency range of 17-24 kilohertz.

14. The method of claim 12, wherein said generating a plurality of acoustic signals including a near ultrasonic acoustic signal comprises:

generating a near ultrasonic tone as said near ultrasonic acoustic signal; and mixing a speech signal and said near ultrasonic tone to produce said plurality of acoustic signals.

15. The method of claim 12, wherein said near ultrasonic acoustic signal comprises a pulse stream having a center frequency within a frequency range of 17-24 kilohertz, a pulse duration and a pulse repetition interval, said pulse duration is substantially less than said pulse repetition interval.

16. The method of claim 12, wherein said generating a plurality of acoustic signals including a near ultrasonic acoustic signal comprises:

generating a near ultrasonic pulse stream as said near ultrasonic acoustic signal; and mixing a speech signal and said near ultrasonic pulse stream to produce said plurality of acoustic signals.

17. The method of claim 12, wherein said processing said plurality of incoming acoustic signals to produce at least one status signal comprises:

preprocessing said plurality of incoming acoustic signals to produce an echo signal that includes a primary signal component related to said incoming near ultrasonic acoustic wave and one or more additional signal components related to other ones of said plurality of incoming acoustic signals, wherein a magnitude of said primary signal component is substantially greater than a magnitude of said one or more additional signal components; and integrating said echo signal by producing said at least one status signal having the multiple portions respectively spanning the multiple time periods, in accordance with an attack-hold-decay integration of said echo signal, wherein the multiple portions include a first portion that ramps up pass an away detection threshold towards the still detection threshold over a first time period, followed by a second portion that is the level portion at the still detection threshold over a second time period that is said time period, and followed by a third portion that ramps down from the still detection threshold towards the away detection threshold over a third time period.

18. The mobile device of claim 1, wherein the signal corresponding to one or more echoes of the outgoing near ultrasonic acoustic wave comprises an envelope corresponding to an echo profile, wherein the envelope is produced based on a time segmented, squared, filtered, and down-sampled signal.

19. The mobile device of claim 1, further comprising determining a deviation of the signal corresponding to one or more echoes of the outgoing near ultrasonic acoustic wave from a mean energy signal.

* * * * *

UNITED STATES PATENT AND TRADEMARK OFFICE
CERTIFICATE OF CORRECTION

PATENT NO. : 10,754,475 B2  
APPLICATION NO. : 16/230908  
DATED : August 25, 2020  
INVENTOR(S) : Tigi Thomas Page 1 of 1

It is certified that error appears in the above-identified patent and that said Letters Patent is hereby corrected as shown below:

In the Claims

Column 12
Line 59, "…follow" should read – "…followed"

Signed and Sealed this
Twenty-seventh Day of October, 2020

Andrei Iancu
*Director of the United States Patent and Trademark Office*